April 20, 1937.　　　T. F. BRANDT　　　2,077,737
CABLE JOINT
Filed March 3, 1936　　　2 Sheets-Sheet 1
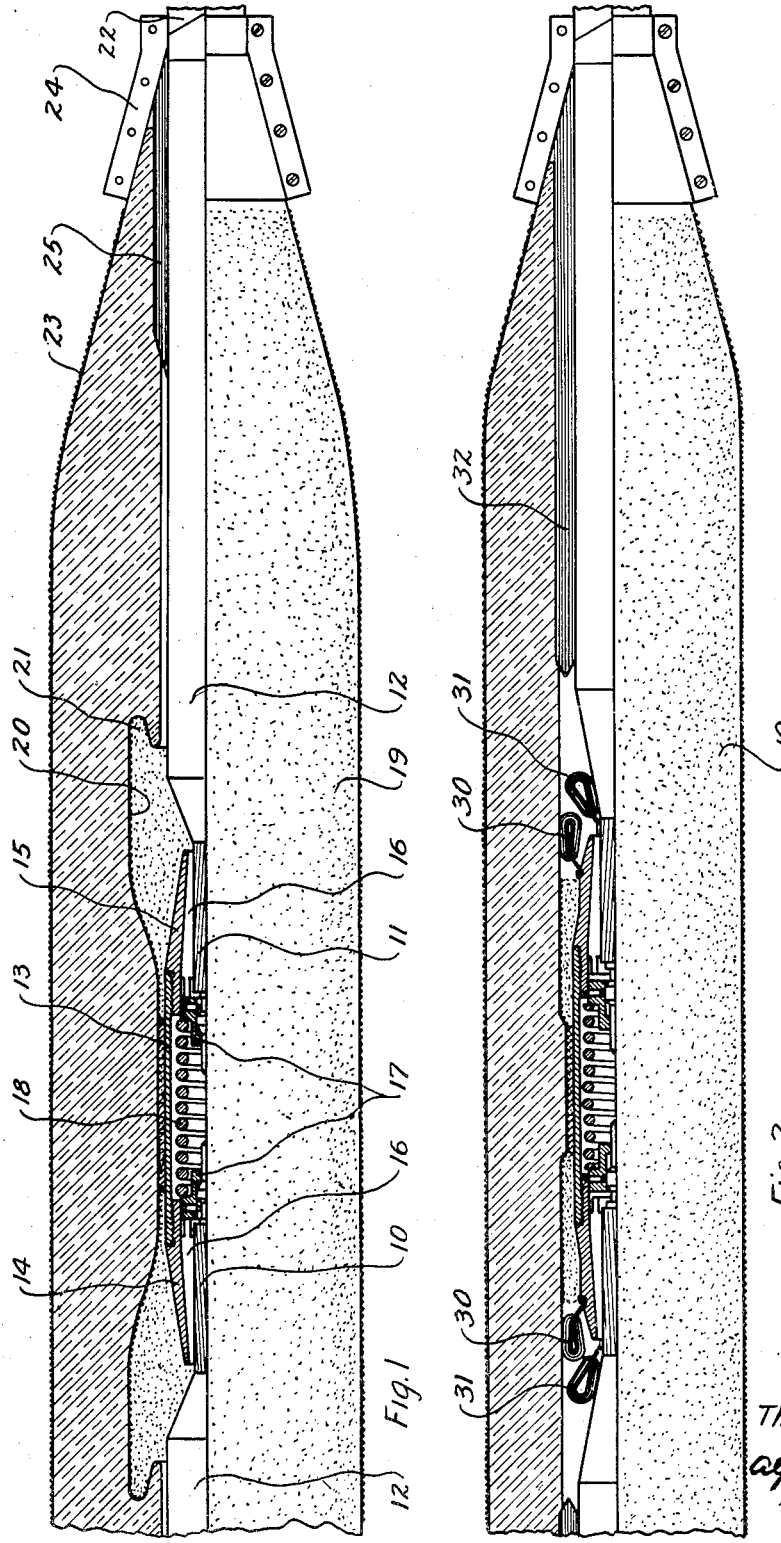
INVENTOR
Thomas F. Brandt
BY
Alpheus J. Crane
ATTORNEY April 20, 1937.  T. F. BRANDT  2,077,737
CABLE JOINT
Filed March 3, 1936  2 Sheets-Sheet 2

INVENTOR
*Thomas F. Brandt*
BY *Alpheus J. Crane*
ATTORNEY

Patented Apr. 20, 1937

2,077,737

UNITED STATES PATENT OFFICE 2,077,737

CABLE JOINT

Thomas F. Brandt, Barberton, Ohio, assignor to The Ohio Brass Company, Mansfield, Ohio, a corporation of New Jersey Application March 3, 1936, Serial No. 66,832

8 Claims. (Cl. 173—268)

This invention relates to cable joints and particularly to means for splicing cable conductors such as are used for power transmission.

One object of the invention is to provide a cable connecter which will automatically grip the cable ends and establish electrical continuity between connected sections.

Another object of the invention is to provide a cable joint which may be enclosed in a porcelain or other dielectric tube and which will not require wrapping to provide insulation for the joint.

A further object of the invention is to provide a cable connecter which may be quickly and easily assembled and which will render unnecessary the large amount of time and labor now required for wrapping cable joints.

A further object of the invention is to provide a device of the class named which shall be of improved construction and operation.

Other objects and advantages will appear from the following description.

The invention is exemplified by the combination and arrangement of parts shown in the accompanying drawings and described in the following specification, and it is more particularly pointed out in the appended claims.

In the drawings:

Fig. 1 is a fragmentary elevation with parts in section showing one embodiment of the present invention.

Fig. 2 is a view similar to Fig. 1 showing a slightly modified form of the invention.

Figures 3, 4:
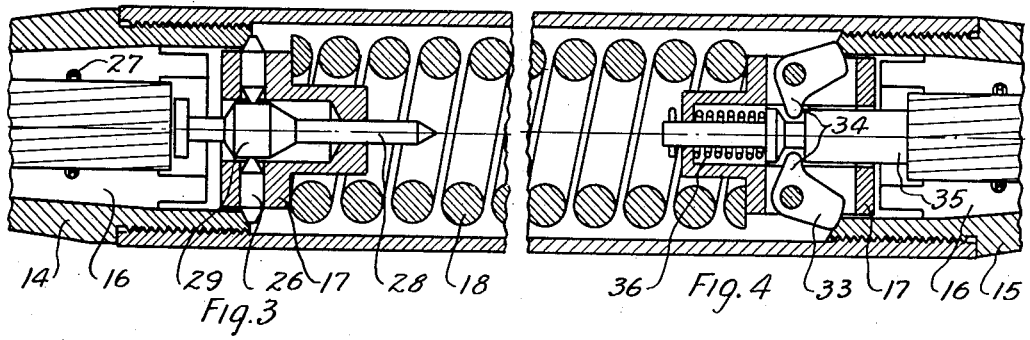
Fig. 3 is a fragmentary section of a portion of the automatic connecter shown in Figs. 1 and 2 on a larger scale.
Fig. 4 is a fragmentary section of a modified form of cable lock.

In the drawings the invention is shown applied to the form of cable which is operated in a conduit filled with insulating oil under high pressure but it will be understood that the invention is applicable to other forms of cable than that illustrated, as will be readily apparent to those skilled in the art. Heretofore when it was necessary to connect the ends of adjacent cable sections, it has been the practice to remove the insulation for a short distance adjacent the ends to be spliced, leaving a portion of the cable bare. A connecter sleeve was then fitted over the adjacent bare ends of the cable and soldered in place to form electrical connection between the two cable sections. After the connection is thus made, it has been the practice carefully to wrap the joint thus formed with varnished cambric and paper tape to provide an insulating covering equivalent to the cable wrapping on the other portions of the cable. This tape must be carefully laid by hand and the operation is usually performed in a man-hole or other inconvenient space, and since several cables are usually laid side by side the space for passing the tape about the joint is very limited, making the operation a long and tedious one. The work must be very carefully done and requires skilled operators accustomed to the work. It usually requires in the neighborhood of 180 man hours to complete a single joint in the manner in which they have heretofore been made.

The present invention avoids the necessity of wrapping insulation about the cable joint and makes possible the use of a solid tube for insulating the joint, thus removing any danger of flaws in the insulating covering. The application of the joint made according to the present invention is a very simple matter and requires only a short time so that not only is a better insulated joint secured but a great saving in time and expense is effected.

In Fig. 1 of the drawings, the numerals 10 and 11 designate respectively the ends of a conductor to be electrically connected. The conductor throughout its length is covered with an insulating wrapping of paper or other suitable material shown at 12. The wrapping is removed for a short distance adjacent the ends to be joined, as has heretofore been the practice. A sleeve 13 of metal having good conductivity forms the electrical connection between the cable sections, and collars 14 and 15 are threaded in the opposite ends of the sleeve 13, the openings in the collars being tapered inwardly toward the outer ends of the collars. A series of wedges 16 having their outer faces tapered to conform to the tapered walls of the collars 14 and 15 are disposed within the collars about the exposed ends of the conductors 10 and 11. Pressure rings 17 bear against the ends of the wedges 16, forcing them into the tapered space between the conductors and the surrounding collars, thus gripping the conductors to hold them in place mechanically, and at the same time to provide electrical connection from the conductors to the collars 15 and thence through the sleeve 13 from one conductor to the other. The pressure rings 17 are firmly pressed against the ends of the wedges 16 by a coil spring 18. The entire joint thus formed is surrounded by a dielectric sleeve 19 which may be made of porcelain or other suitable insulating material.

The inner wall of the opening in the porcelain 19 about the cable joint is preferably covered with a metallic coating 20 which extends into pockets 21 at each end of the joint to provide an insulated flux control for the electrostatic lines of force emanating from the joint so as to prevent electrical discharge along the surface of the insulation 12. The outer surface of the cable outside the tube 19 is provided with the usual metallic wrapping 22 which terminates adjacent the end of the tube 19. The outer surface of the tube 19 is covered with a metallic coating 23 and this coating is electrically connected with the wrapping 22 by a metal cone 24 which is bolted in place, overlapping a portion of the end of the wrapping 22 and of the metallic coating 23. The insulation 12 about the cable at the end of the tube 19 may be reinforced by an insulating wrapping or tube 25 which may be readily placed in position before the joint is assembled and before the cable is placed within the tube 19.

As will be seen more clearly from Fig. 3, the pressure collars 17 are provided with lock pins 26 which, prior to assembly of the joint, engage the ends of the collars 14 and 15 and hold the pressure rings 17 from engagement with the wedges 16. Several wedges 16 are provided and are held in place against the inner walls of the collars 14 and 15 by spring rings 27 or any other suitable means for retaining the wedges in position. A trip pin 28 is provided with an enlargement 29 which engages the inner ends of the lock pins 26 and holds them outwardly in position to contact with the ends of the collars 14 and 15. The outer ends of the pins 26 are tapered and the ends of the collars 14 and 15 are bevelled so that the pressure of the spring 18 tends to move the lock pins 26 inwardly.

The sleeve 13 is cemented in position in the tube 19 and prior to installation of the joint, the spring 18 is compressed and the pressure rings 27 are held from engaging the wedges 16 by the lock pins 26, the enlargement 29 being set in contact with th inner ends of the lock pins. With the parts thus set when it is desired to assemble the joint, it is only necessary to shove the bared ends of the cables into the opposite ends of the tube 19. When the end of the cable engages the trip pin 28, the enlargement 29 is moved to the right, as viewed in Fig. 3, out of registration with the ends of the lock pins 26 and the lock pins immediately move inwardly due to the inclined bearing faces on their outer ends so as to release the pressure ring 17, which is immediately forced outwardly by the spring 18 into contact with the ends of the wedges 16. The pressure of the ring 17 against the wedges 16 forces them home in the tapered space between the conductor and the surrounding collar so as to grip the conductor firmly and establish mechanical and electrical connection therewith. The conductors may be inserted simultaneously from both ends of the sleeve 19 or they may be inserted one at a time as it is not necessary to release both pressure rings at the same time. Once the pressure rings have been released, a permanent connection is established between the cable sections and the joint is completely insulated by an electric tube surrounding the locking mechanism. When the cable is installed in its conduit and surrounded by oil under pressure, the oil will enter the space within the tube 19 and fill the recess about the joint. This oil may enter through the joints between the sections of the metal sleeve 24 or the metal sleeve may be provided with a plurality of small perforations to facilitate entrance of the oil into the cable joint.

Instead of the formed controls 21 shown in Fig. 1, the joint may be equipped with wrapped controls shown at 30 and 31 in Fig. 2. A suitable form of wrapped control for this purpose is shown and described in Patent #1,972,590, granted Sept. 4, 1934 to Ralph Higgins. The form of the invention shown in Fig. 2 is otherwise similar to that in Fig. 1 except that the shape of the porcelain tube 19 is a little different to accommodate the different form of flux controls, and a little different insulating wrapping 32 is employed, due to the difference in the bore of the porcelain tube.

In Fig. 4 there is shown a slightly different form of lock mechanism for the pressure ring 17. In this form of the invention, the lock pins 26 are replaced by pivoted dogs 33 which engage the end of the collar 15 to hold the pressure ring in set position until tripped by the end of the conductor. The dogs 33 have inwardly projecting fingers 34 which extend into a groove in the trip pin 35 so that when the pin is pressed inwardly by the end of the conductor, the dogs will be moved out of contact with the collar 15, permitting the pressure ring 17 to engage the ends of the wedges 16. The trip pin 35 is held outwardly by a spring 36 until it is compressed by pressure of the conductor on the end of the pin.

Figure 5:
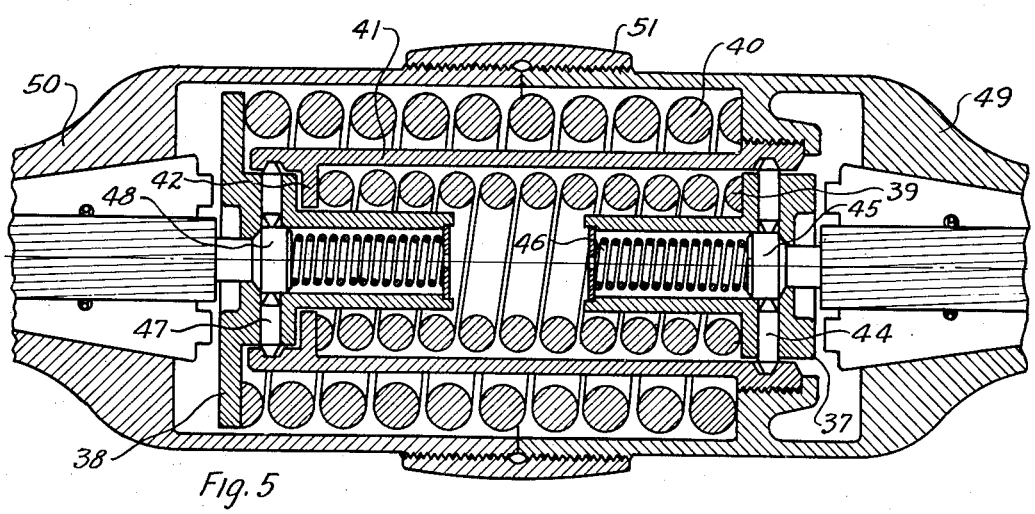
Figs. 5 and 6 are sectional views showing other modifications of the invention.

In the modification shown in Fig. 5, the pressure rings 37 and 38 are provided with separate springs 39 and 40 respectively. The spring 39 is enclosed in a tube 41 having an abutment flange 42 for the end of the spring and having a circumferential groove for receiving the ends of the lock pins 44. A trip pin 45 is pressed outwardly by a spring 46 for holding the lock pins 44 in place until the trip pin is moved inwardly by the conductor against the force of the spring 46. The opposite end of the sleeve 41 is provided with a groove for lock pins 47 which hold the pressure ring 38 in its retracted position until released by the trip pin 48. In this form of the invention, the collars 49 and 50 have inwardly extending portions secured together by a sleeve 51 provided with right and left hand threads for engaging complementary threads on the projections. In this form of the invention, both springs may be compressed and locked in place before the collars are connected by the sleeve 51.

By the arrangement shown in Fig. 5, it will be seen that the springs 39 and 40 operate independently of each other on their respective pressure rings. In the various forms shown, the pressure rings are initially spaced a little distance away from the ends of their wedges so that when they are released, they will have a short distance to travel before striking the ends of the wedges so that they impart an initial blow to the wedges which helps to drive them home.

Figure 6:
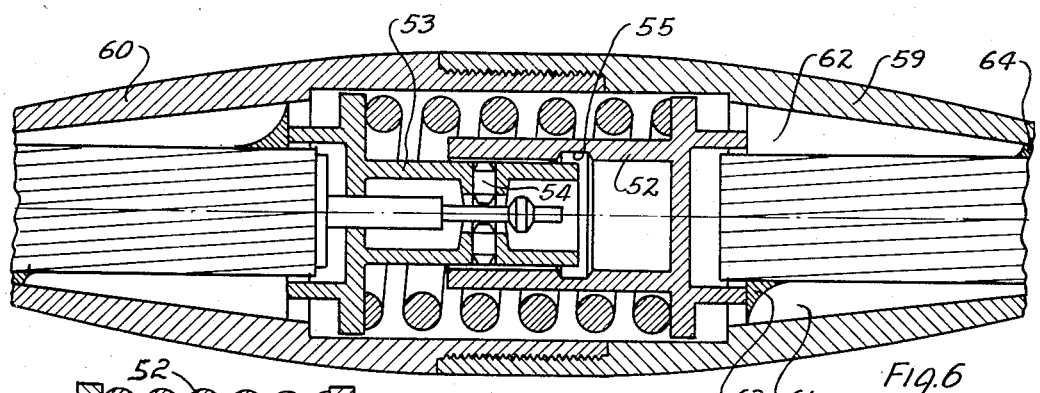
Figure 7:
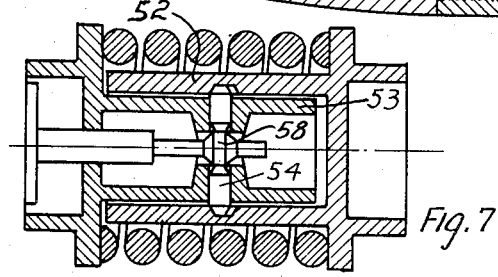
Fig. 7 is a sectional view of the locking mechanism shown in Fig. 6 before the lock is sprung.

In the form of the invention shown in Figs. 6 and 7, a single trip device is used for releasing simultaneously the grips for both cable sections. The trip mechanism in this instance comprises a pair of telescoping sleeves 52 and 53, the inner sleeve 53 being provided with lock pins 54 arranged to engage a groove 55 in the outer sleeve to lock the parts in their contracted position, as shown in Fig. 7. A trip pin 58 holds the lock pins in engagement with the groove in the outer sleeve when the spring is compressed, as shown in Fig. 7. The pressure unit comprising the two pressure sleeves and their spring is self-contained and may be compressed and locked before inserting in the tapered collars 59 and 60.

When the parts are assembled, as shown in Fig. 6, but before the spring is released, the right hand cable section is first inserted into position and then the left hand section is inserted and pressed against the end of the trip pin 58 to release the spring and permit the pressure rings to be moved outwardly to contact with the wedges to lock the conductor sections in place.

In Fig. 6 a modified form of wedge assembly is shown, the wedge in this case being made up of a cone having a cylindrical bore and tapered outer surface, the cone being provided with slits, shown at 61 and 62, which divide the cone up into a plurality of wedge sections, alternate slits being cut from the opposite ends of the cone to leave adjacent wedge sections connected together by a small portion of metal 63 and 64, alternate slits being thus closed at opposite ends.

I claim:

1. A cable splicer comprising an insulating sleeve, spring actuated means disposed within said sleeve for gripping a conductor and trip mechanism for releasably holding said gripping means in position to receive a conductor, said trip mechanism being releasable by a conductor inserted into position to be engaged by said gripping means.

2. A cable splicer comprising an insulating sleeve, cable gripping means secured within said sleeve, a spring for actuating said gripping means, and trigger mechanism for holding the spring retracted with said gripping means in conductor receiving position, said trigger mechanism being arranged to be tripped by a conductor to release said spring and cause said gripping means to grip said conductor when said conductor is inserted into position to be held by said gripping means.

3. A cable splicer comprising an insulating sleeve, cable gripping means secured within said sleeve, a spring for actuating said cable gripping means, trigger mechanism for holding said spring stressed with said cable gripping means in receiving position, said trigger mechanism comprising a trip device in the path of a cable inserted into position to be received by said cable gripping means, said trip device being arranged to release said spring when engaged by a conductor to permit said spring to close said cable gripping means on said conductor.

4. A cable splicer comprising a tubular dielectric member, means within said tubular member for electrically connecting the ends of conductor sections inserted through the opposite ends of said dielectric member, said connecting means comprising spring actuated grippers for engaging the ends of said conductor sections, and trip mechanism operated by the conductor sections for effecting operation of said grippers.

5. A cable splicer comprising an insulating sleeve, a collar secured within said sleeve and having a tapered opening therein, wedging means cooperating with said collar for gripping a conductor, a spring for operating said wedging means, and trip mechanism for holding said spring in inoperative position but adapted to release said spring to cooperate with said wedges when a conductor is inserted into gripping relation with said wedges.

6. A cable splicer comprising a dielectric tube, a collar having a tapered opening therein disposed in said tube, wedges cooperating with said collar to grip a conductor, a spring for actuating said wedges, and trip mechanism for holding said spring stressed, said trip mechanism having a portion to be engaged by a conductor to release said spring and cause said wedges to grip said conductor when said conductor is inserted into position to be gripped by said wedges.

7. The combination with a porcelain tube, of a conductor sleeve disposed within said tube and having gripping mechanism for connecting adjacent ends of conductor sections inserted into the opposite ends of said tube, a spring for operating said gripping mechanism and trip mechanism for holding said spring in inoperative position but actuated by a conductor inserted into said tube to release said spring to operate said gripping mechanism.

8. The combination with a tubular dielectric member, of a conductor coupling secured within said member between the ends thereof, said coupling having oppositely directed spring actuated grippers for engaging conductor sections inserted into said tubular member at the opposite ends thereof, and trip mechanism for controlling said grippers to hold said grippers normally in position to receive a conductor until said grippers are released by a conductor inserted into gripping position.

THOMAS F. BRANDT.